United States Patent [19]
Chang et al.

[11] Patent Number: 6,104,719
[45] Date of Patent: Aug. 15, 2000

[54] STATE MACHINE TO SUPPORT CONCURRENT MESSAGE STREAMS

[75] Inventors: Wei Henry Chang; Basudeb Dash; Kesavamurthy Nagaraj, all of Plano; Natarajan Govindirajan, Dallas, all of Tex.

[73] Assignee: Nortel Networks Corporation, Montreal, Canada

[21] Appl. No.: 08/994,740

[22] Filed: Dec. 19, 1997

[51] Int. Cl.[7] .................................................. H04L 12/54
[52] U.S. Cl. ............................................ 370/428; 370/413
[58] Field of Search .................................... 370/428, 230, 370/252, 257, 261, 264, 270, 360, 377, 379, 382, 384, 386, 410, 412, 413, 415, 417, 421, 422, 432, 447, 461, 462, 229, 231, 235

[56] References Cited

U.S. PATENT DOCUMENTS 5,056,114  10/1991  Wight .
5,093,830   3/1992  Munter .
5,828,468  10/1998  Lee et al. .................................. 358/434
5,913,062   6/1999  Vrvilo et al. ............................. 709/301
5,933,412   8/1999  Choudhury et al. ..................... 370/218
5,987,549  11/1999  Hagersten et al. ...................... 710/107
5,991,389  11/1999  Ram et al. ............................... 379/230

*Primary Examiner*—Dang Ton
*Assistant Examiner*—Phirin Sam
*Attorney, Agent, or Firm*—Haynes & Boone, L.L.P.

[57] ABSTRACT

A system and method for supporting concurrent message streams. The state machine is used for modeling a digital system having several states. The states represent messages in the digital system. Added to the state machine is a regressive state. The regressive state is connected to each of the states and all transitions between the states go through the regressive state. Also, queues are provided with the state machine to facilitate the concurrent message streams. A queue may be provided with each state so that if multiple message streams are at a single state, they may be stored in the queue provided with the state. Alternatively, a queue may be provided with each message stream so that each queue can keep track of the state at which the corresponding message stream is located.

18 Claims, 2 Drawing Sheets

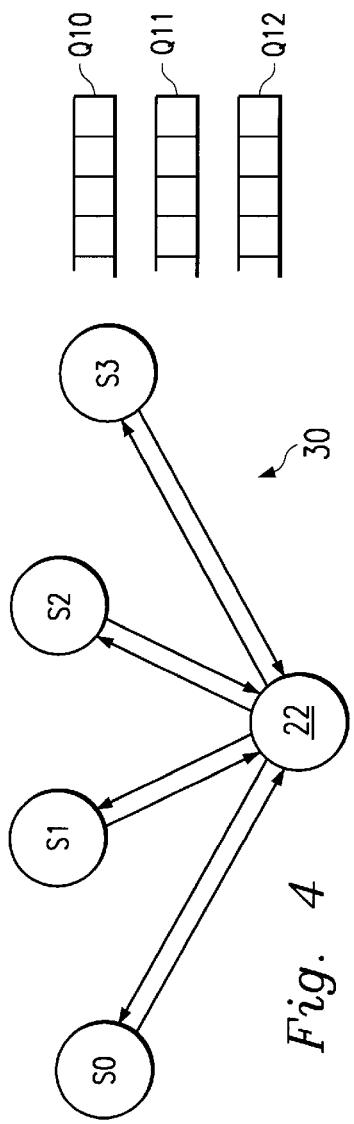
Fig. 4
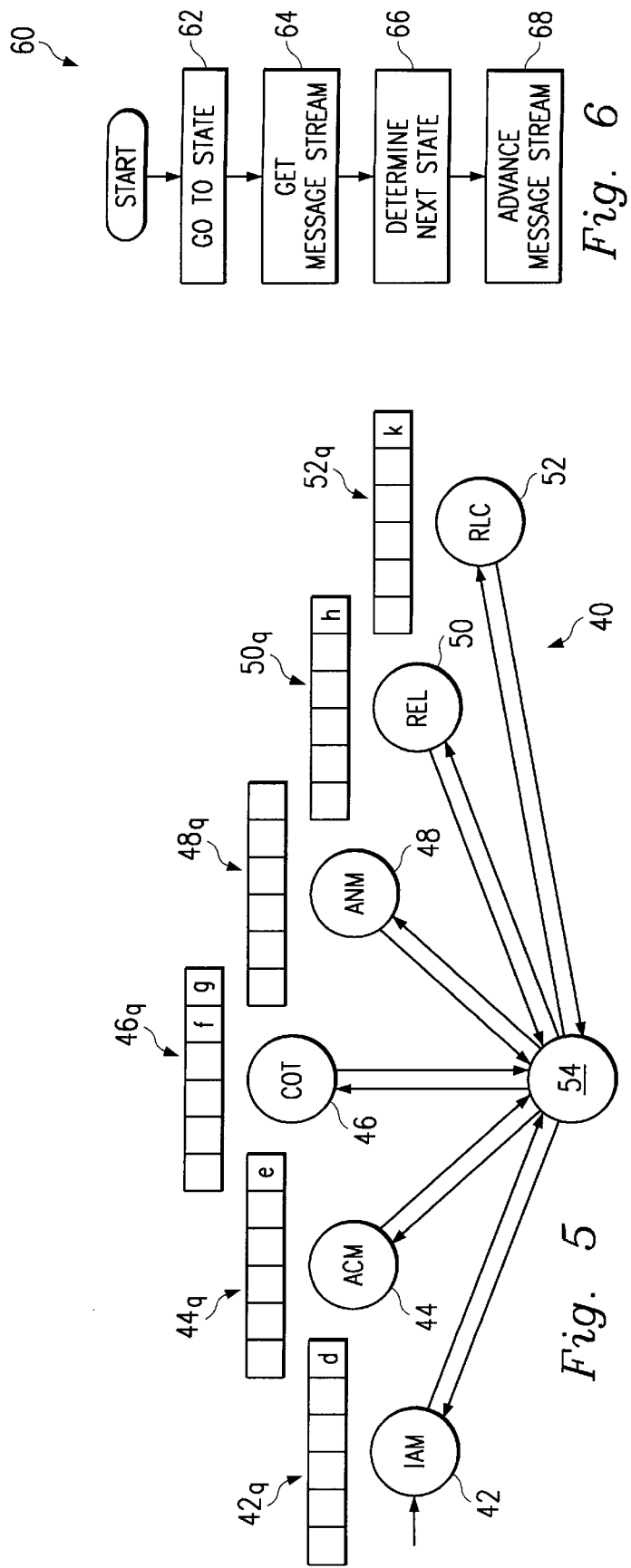
Fig. 5
Fig. 6

STATE MACHINE TO SUPPORT CONCURRENT MESSAGE STREAMS

FIELD OF THE INVENTION

This invention generally relates to digital systems utilizing event driven techniques, and more particularly, to a method and system for supporting multiple messages in a state machine of the digital systems.

BACKGROUND OF THE INVENTION

Digital systems are often controlled by event-driven techniques, such as a parallel or sequential networks that advance from one "state" to the next according to a predetermined sequence. Hence, these digital systems, together with the states and event driven techniques, are often called finite state machines. The advancement from a present state to a next state of a finite state machine can be in response to clock pulses, such as in a synchronous state machine, or to other criteria, such as interrupt requests in an asynchronous state machine. Traditionally, progression through the state machine is a function of an input and the present state.

Finite state machines are often used for modeling telecommunication systems. For example, a network switch using Integrated Services Digital Network User Part (ISUP) for controlling a call may utilize a finite state machine. Current ISUP messages include: an initial address message (IAM), a continuity check message (COT), an address complete message (ACM), an answer message (ANM), a release message (REL), and a release complete message (RLC). Each message can be represented as a state of the finite state machine and a call may progress sequentially through multiple combinations of the states. For example, a call can progress from the ANM state, to the REL state, and then to the RLC state.

Difficulties arise when streams of concurrent calls, or "message streams," exist. Typical state machines have a restriction that only one message stream is supported at a time. Therefore, to model concurrent message streams, the typical state machine must be duplicated, one for each message stream. However, considering a state machine that has P states and Q transitions between the states, if there are N concurrent message streams, the multiple copies of the state machine will have N×P states and N×Q+(N×P)×((N−1)×P) transitions. The (N×P)×((N−1)×P) transitions are required because the digital system performing the transitions, in response to received inputs, must logically move between each of the states in each of the state machines, thereby requiring transitions between every state.

Referring to FIG. 1, an exemplary conventional state machine 10 has four states S0, S1, S2, S3 representing individual actions to be performed. The exemplary state machine 10 also has six transitions Tij, where the letter "i" designates a present state Si and the letter "j" designates a next state Sj. State S0 represents an initial state from which the state machine 10 is entered.

Referring also to FIG. 2, to handle three concurrent message streams, the exemplary state machine 10 (FIG. 1) must be duplicated to produce three state machines 10a, 10b, and 10c, (the states in each state machine include the suffix a, b, c corresponding to the state machine 10a, 10b, 10c, respectively). All the transitions are also duplicated. However, additional transitions are also required to link a state of each state machine to every state of every other state machine. For example, the state S1c of the state machine 10c includes additional links to S0a, S1a, S2a, S3a, S0b, S1b, S2b, S3b. There are eighty eight additional links which are not shown, for the sake of clarity.

Therefore, it becomes immediately evident that as the number of concurrent message streams and/or the number of states increase, the multiple state machines become too large to be efficiently managed.

SUMMARY OF THE INVENTION

A system and method according to the invention provides a state machine for supporting concurrent message streams. In one embodiment, the state machine is used for modeling a digital system having several states. The states represent messages in the digital system. Added to the state machine is a regressive state. The regressive state is connected to each of the states and all transitions between the states go through the regressive state.

Also, queues are provide with the state machine to facilitate the concurrent message streams. In one embodiment, a queue is provided with each state. As a result, if multiple message streams are at a single state, they may be stored in the queue provided with the state. In another embodiment, a queue is provided with each message stream. As a result, each queue can keep track of the state at which the corresponding message stream is located.

An advantage achieved with the present invention is that a single state machine can support several concurrent message streams.

BRIEF DESCRIPTION OF THE DRAWINGS

The invention will be further understood by reference to the drawings in which:

FIG. 4 illustrates another embodiment of a state machine implementing features of the present invention;

FIG. 5 illustrates an example digital system using the state machine of FIG. 3; and FIG. 6 is a flowchart of a method used to advance message streams through the digital system of FIG. 5.

DETAILED DESCRIPTION OF THE PREFERRED EMBODIMENTS

As described above, FIGS. 1 and 2 represent an exemplary conventional state machine 10 and multiple copies thereof.

Figure 1:
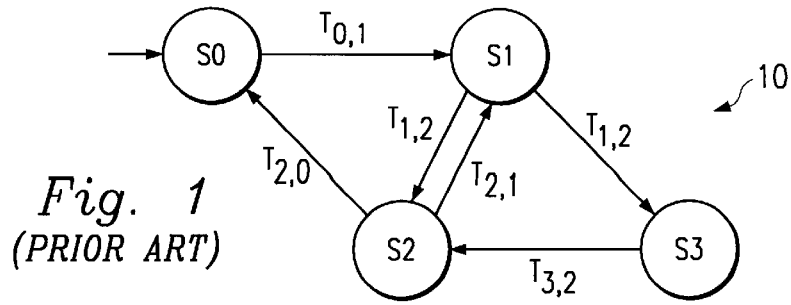
FIG. 1 illustrates a conventional state machine having four states.
Figure 2:
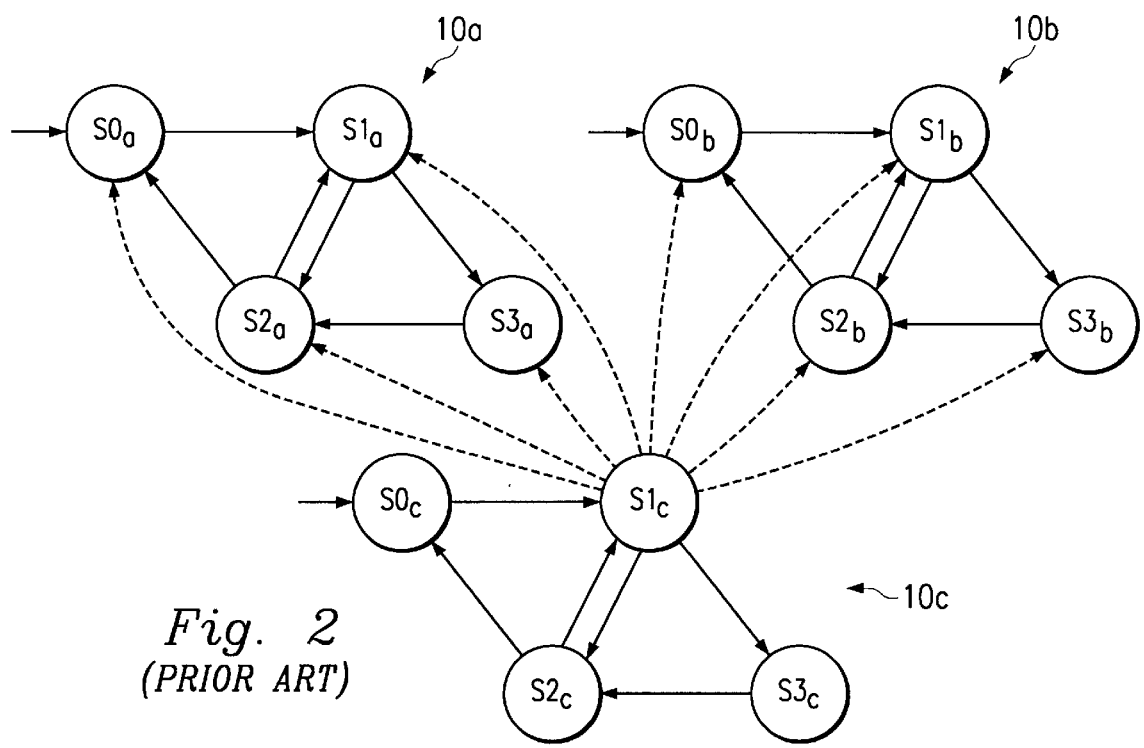
FIG. 2 illustrates three copies of the conventional state machine of FIG. 1 supporting three concurrent message streams.
Figure 3:
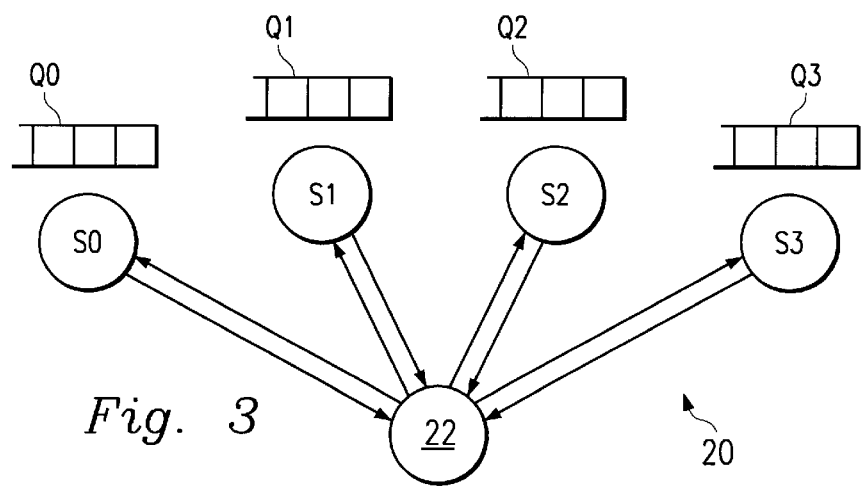
FIG. 3 illustrates one embodiment of a state machine implementing features of the present invention.

Referring to FIG. 3, a regressive attached queue state machine (RAQSM) 20 is used for implementing one embodiment of the invention. The RAQSM 20 includes the same four states S0, S1, S2, S3 of the conventional state machine 10 (FIG. 1). In addition, the RAQSM 20 has a regressive state 22. Furthermore, instead of transitions between the original four states S0, S1, S2, S3, all transitions are now to and from the regressive state 22, as shown. Finally, each of the original four states S0, S1, S2, S3 is outfitted with a queue Q0, Q1, Q2, Q3, respectively.

Instead of messages moving from one of the original four states to another, the messages always return to the regressive state 22 before proceeding to the next state. For example, instead of a message advancing from state S1 to state S2, the message moves from the state S1, to the regressive state 22, and then to state S2. Also, since there are concurrent message streams (three in the present example), each queue Q0, Q1, Q2, Q3 has a number of slots equal to the number of message streams. In this way, if all the message streams are at the same state, all may be stored in the corresponding queue.

Referring to FIG. 4, in a second embodiment, a RAQSM 30 includes the same four states S0, S1, S2, S3 and the regressive state 22 of the RAQSM 20 (FIG. 3). As in the RAQSM 20, instead of transitions between the original four states S0, S1, S2, S3, all transitions are now to and from the regressive state 22, as shown. However, instead of having a queue for each of the original four states S0, S1, S2, S3, the RAQSM 30 has a queue Q10, Q11, Q12 for each message stream. Each queue Q1O, Q11, Q12 has a number of slots equal to the number of original states (four in the present example). In this way, the present state for each message is separately stored.

Referring to FIG. 5, an example of the first embodiment RAQSM 20 is provided in a RAQSM 40 used for modeling ISUP messaging in a switch network. The RAQSM 40 has six states: IAM 42, COT 44, ACM 46, ANM 48, REL 50, and RLC 52, each having an associated queue 42q, 44q, 46q, 48q, 50q, and 52q, respectively. The RAQSM 40 also includes a regressive state 54. In the present example, the IAM 42 is the initial state of the RAQSM 40. Also for example, consider that six concurrent message streams d, e, f, g, h, k already exist in the RAQSM 40.

Referring also to FIG. 6, a method 60 is use to advance the different message streams d, e, f, g, h, k through the RAQSM 40. The message 60 is initiated by an interrupt, such as when a new call arrives at IAM 42, a wake-up signal signifies that a predetermined amount of time has expired, or some other indication. At step 62, the RAQSM 40 goes to the state that caused the interrupt (in the present example, message stream d at IAM 42 generated the interrupt). At step 64, the RAQSM 40 will determine which call caused the interrupt (message stream d). At step 66, the RAQSM 40 determines the next state for the requesting call (ACM 44). At step 68, the RAQSM 40 moves the message stream to the next state. (Message stream d is now placed in queue 44q). As a result, the RAQSM 40 can handle many consecutive message streams in a relatively simple and non-complex manner.

Although illustrative embodiments have been shown and described, a latitude of modification, change and substitution is intended in the foregoing disclosure, and in certain instances, some features will be employed without a corresponding use of other features. Furthermore, additional features, such as error handling routines, may be added to the illustrative embodiment without altering the scope of the embodiment. Accordingly, it is appropriate that the appended claims be construed broadly.

What is claimed is:

1. A method for modeling a digital system having a plurality of states, comprising:
   adding a regressive state to the plurality of states;
   providing a transition between each one of the plurality states and the regressive state; and
   providing a separate queue for each of the plurality of states;
   wherein a message stream transitions between two of the plurality of states through the regressive state; and
   wherein each of the queues is capable of storing multiple message streams.

2. The method of claim 1 wherein a plurality of message streams may concurrently exist at each one of the states and wherein each of the queues includes a slot for each of the message streams.

3. The method of claim 1 wherein all transitions are to and from the regressive state.

4. The method of claim 1 wherein the digital system is a switch network.

5. The method of claim 4 wherein the plurality of states represent integrated services digital network user part ("ISUP") messages used by the switch network.

6. A method for modeling a digital system having a plurality of states, comprising:
   adding a regressive state to the plurality of states;
   providing a transition between each one of the plurality states and the regressive state; and
   providing a queue for each of a plurality of message streams, each queue containing a slot for each of the plurality of states;
   wherein a message stream transitions between two of the plurality of states through the regressive state.

7. The method of claim 6 wherein all transitions are to and from the regressive state.

8. The method of claim 6 wherein the digital system is a switch network.

9. The method of claim 8 wherein the plurality of states represent integrated services digital network user part ("ISUP") messages used by the switch network.

10. A digital system for concurrently supporting a plurality of message streams comprising:
    a plurality of states representing messages in the digital system;
    a separate queue for each of the plurality of message streams;
    a regressive state connected to each of the plurality of states; and
    a transition between each one of the plurality states and the regressive state;
    wherein message streams transition between two of the plurality of states through the regressive state;
    wherein each of the queues includes a slot for each of the plurality of states.

11. The digital system of claim 10 wherein all transitions are to and from the regressive state.

12. The digital system of claim 10 being a switch network and wherein the plurality of states represent integrated services digital network user part ("ISUP") messages used by the digital switch.

13. A digital system for concurrently supporting a plurality of message streams comprising;
    a plurality of states representing messages in the digital system;
    a separate queue for each of the plurality of states;
    a regressive state connected to each of the plurality of states; and
    a transition between each one of the plurality states and the regressive state;
    wherein message streams transition between two of the plurality of states through the regressive state;
    wherein each of the queues includes a slot for each of the plurality of message streams.

14. The digital system of claim 13 wherein all transitions are to and from the regressive state.

15. The digital system of claim 13 being a switch network and wherein the plurality of states represent integrated services digital network user part ("ISUP") messages used by the digital switch.

16. A state machine for modeling a digital system having a plurality of states and supporting a plurality of message streams, the state machine comprising:

a computer-readable storage medium;

a plurality of states recorded on the medium for representing messages in the digital system;

a queue recorded on the medium for supporting the message streams in the digital system;

a regressive state recorded on the medium, the regressive state being connected to each of the plurality of states;

transitions recorded on the medium, the transitions being between each one of the plurality states and the regressive state, wherein each one of the plurality of message streams transitions between two of the plurality of states through the regressive state.

17. A state machine for modeling a digital system having a plurality of states and supporting a plurality of message streams, the state machine comprising:

a computer-readable storage medium;

the plurality of states recorded on the medium for representing messages in digital system;

a separate queue for each of the message streams in the digital system recorded on the medium, each of the queues for supporting the respective message stream;

a regressive state recorded on the medium, the regressive state being connected to each of the plurality of states; and transitions recorded on the medium, the transitions being between each one of the plurality states and the regressive state, wherein each one of the plurality of message streams transitions between two of the plurality of states through the regressive state;

wherein each of the queues provides a slot for each of the plurality of states.

18. A state machine for modeling a digital system having a plurality of states and supporting a plurality of message streams, the state machine comprising:

a computer-readable storage medium;

the plurality of states recorded on the medium for representing messages in the digital system;

a separate queue for each of the plurality of states recorded on the medium for supporting the message streams in the digital system;

a regressive state recorded on the medium, the regressive state being connected to each of the plurality of states; and transitions recorded on the medium, the transitions being between each one of the plurality states and the regressive state, wherein each one of the plurality of message streams transitions between two of the plurality of states through the regressive state;

wherein each of the queues provides a slot for each of the plurality of message streams.

* * * * *